United States Patent
Johnson

(10) Patent No.: US 11,407,290 B1
(45) Date of Patent: Aug. 9, 2022

(54) PIVOTING MIRROR SUNSHIELD APPARATUS

(71) Applicant: Joyce Johnson, Steilacoom, WA (US)

(72) Inventor: Joyce Johnson, Steilacoom, WA (US)

( * ) Notice: Subject to any disclaimer, the term of this patent is extended or adjusted under 35 U.S.C. 154(b) by 0 days.

(21) Appl. No.: 17/177,790

(22) Filed: Feb. 17, 2021

(51) Int. Cl.
  *B60J 3/02* (2006.01)

(52) U.S. Cl.
  CPC ........... *B60J 3/0213* (2013.01); *B60J 3/0278* (2013.01)

(58) Field of Classification Search
  CPC ...... B60J 3/0213; B60J 3/0278; B60J 3/0204; B60J 3/0208; B60J 3/0295
  USPC .................... 296/97.1, 97.5, 97.6, 97.7, 97.9
  See application file for complete search history.

(56) References Cited

U.S. PATENT DOCUMENTS

| | | | |
|---|---|---|---|
| 2,549,395 A | 4/1951 | Short | |
| 2,620,222 A | 12/1952 | Beauchamp | |
| 4,958,879 A | 9/1990 | Gillum | |
| 5,979,967 A | 11/1999 | Poulson | |
| 6,296,294 B1 | 10/2001 | Kohnle | |
| 6,513,855 B2 | 2/2003 | Zenisek | |
| D495,639 S | 9/2004 | Sheridan | |
| 6,938,942 B1 * | 9/2005 | Ytterberg | B60J 3/002 296/97.7 |
| 6,945,587 B2 | 9/2005 | Smoot | |
| 7,014,244 B1 | 3/2006 | Bladwin | |
| 8,287,025 B1 * | 10/2012 | Bandola | B60J 3/0208 296/97.1 |
| 8,746,775 B2 | 6/2014 | Chino | |

* cited by examiner

Primary Examiner — Joseph D. Pape

(57) ABSTRACT

A pivoting mirror sunshield apparatus for preventing glare around rearview mirrors includes a visor body having a body front side, a body back side, a body top edge, a body bottom edge, a body left edge, and a body right edge. The body bottom edge has a cutout portion extending towards the body top edge to accommodate a mounting arm of a rearview mirror of a vehicle. A plurality of clip pivots is coupled to the visor body. Each clip pivot is coupled to the body front side. A plurality of mirror clips is coupled to the plurality of clip pivots. Each mirror clip has a pivot portion pivotably coupled to the respective clip pivot and a clip portion to selectively engage a mirror top edge of the rearview mirror.

9 Claims, 7 Drawing Sheets

PIVOTING MIRROR SUNSHIELD APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to mirror sunshield devices and more particularly pertains to a new mirror sunshield device for preventing glare around rearview mirrors.

(2) Description of Related Art Including Information Disclosed Under 37 CFR 1.97 and 1.98

The prior art relates to mirror sunshield devices. Known devices typically attach to the mount of the rearview mirror of a vehicle rather than directly to the mirror itself. Of those devices which attach to the mirror, they are typically fixed and parallel to the mirror. Known devices fail to offer a pair of pivoting attachment points to attach directly to the mirror but allow for a changing relative angle.

BRIEF SUMMARY OF THE INVENTION

An embodiment of the disclosure meets the needs presented above by generally comprising a visor body having a body front side, a body back side, a body top edge, a body bottom edge, a body left edge, and a body right edge. The body bottom edge has a cutout portion extending towards the body top edge configured to accommodate a mounting arm of a rearview mirror of a vehicle. A plurality of clip pivots is coupled to the visor body. Each clip pivot is coupled to the body front side. A plurality of mirror clips is coupled to the plurality of clip pivots. Each mirror clip has a pivot portion pivotably coupled to the respective clip pivot and a clip portion configured to selectively engage a mirror top edge of the rearview mirror.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
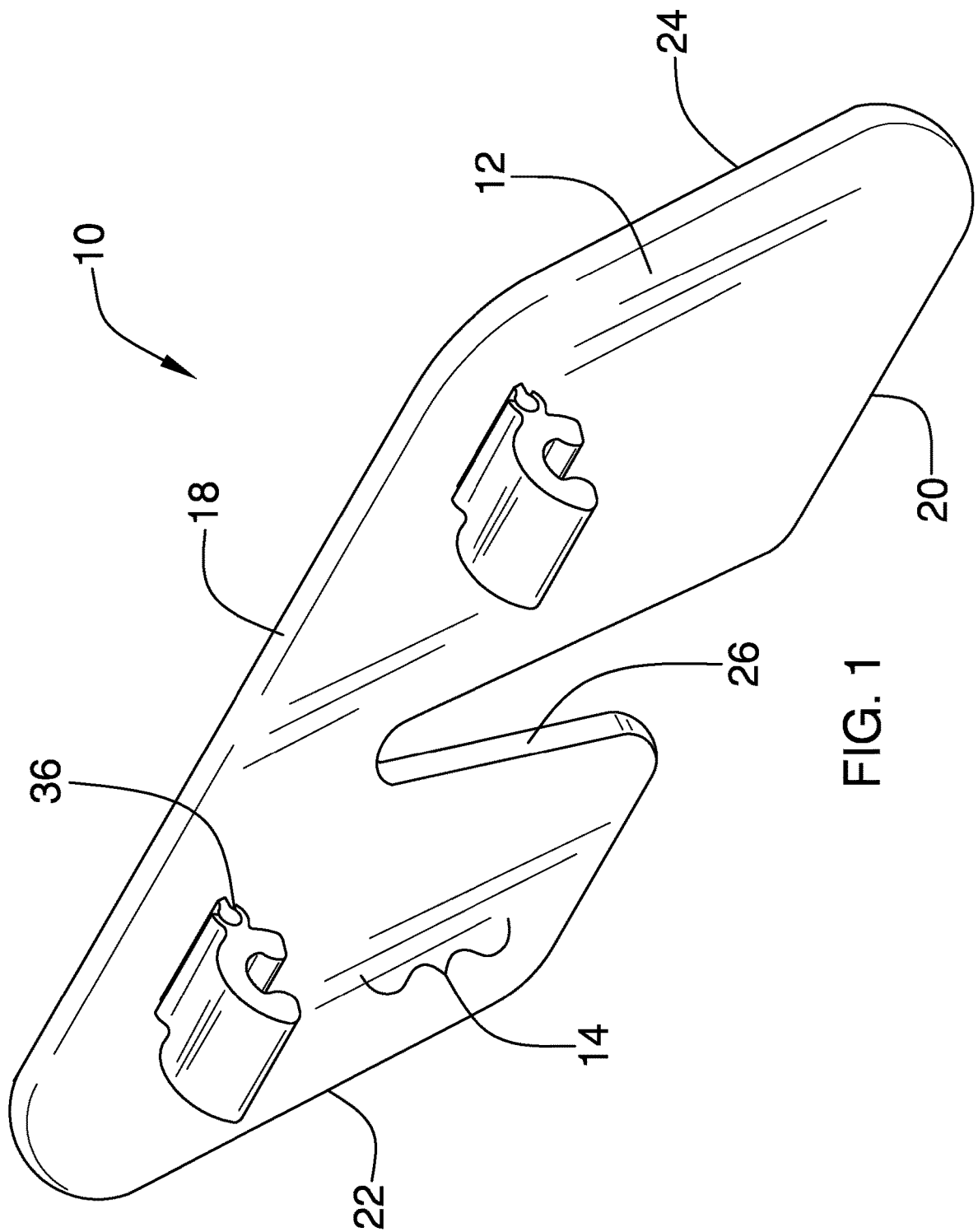
FIG. 1 is an isometric view of a pivoting mirror sunshield apparatus according to an embodiment of the disclosure.
Figure 2:
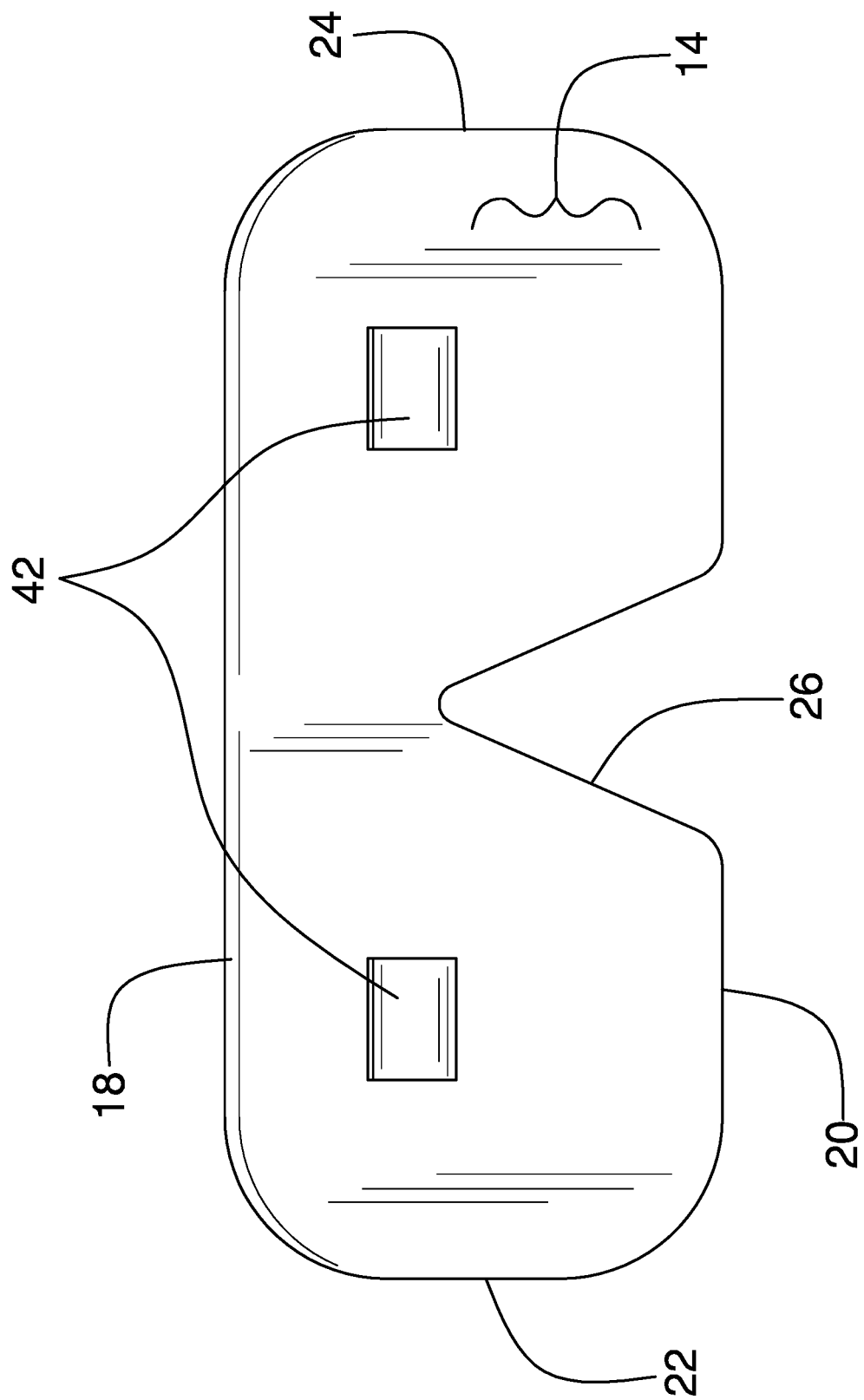
FIG. 2 is a front elevation view of an embodiment of the disclosure.
Figure 3:
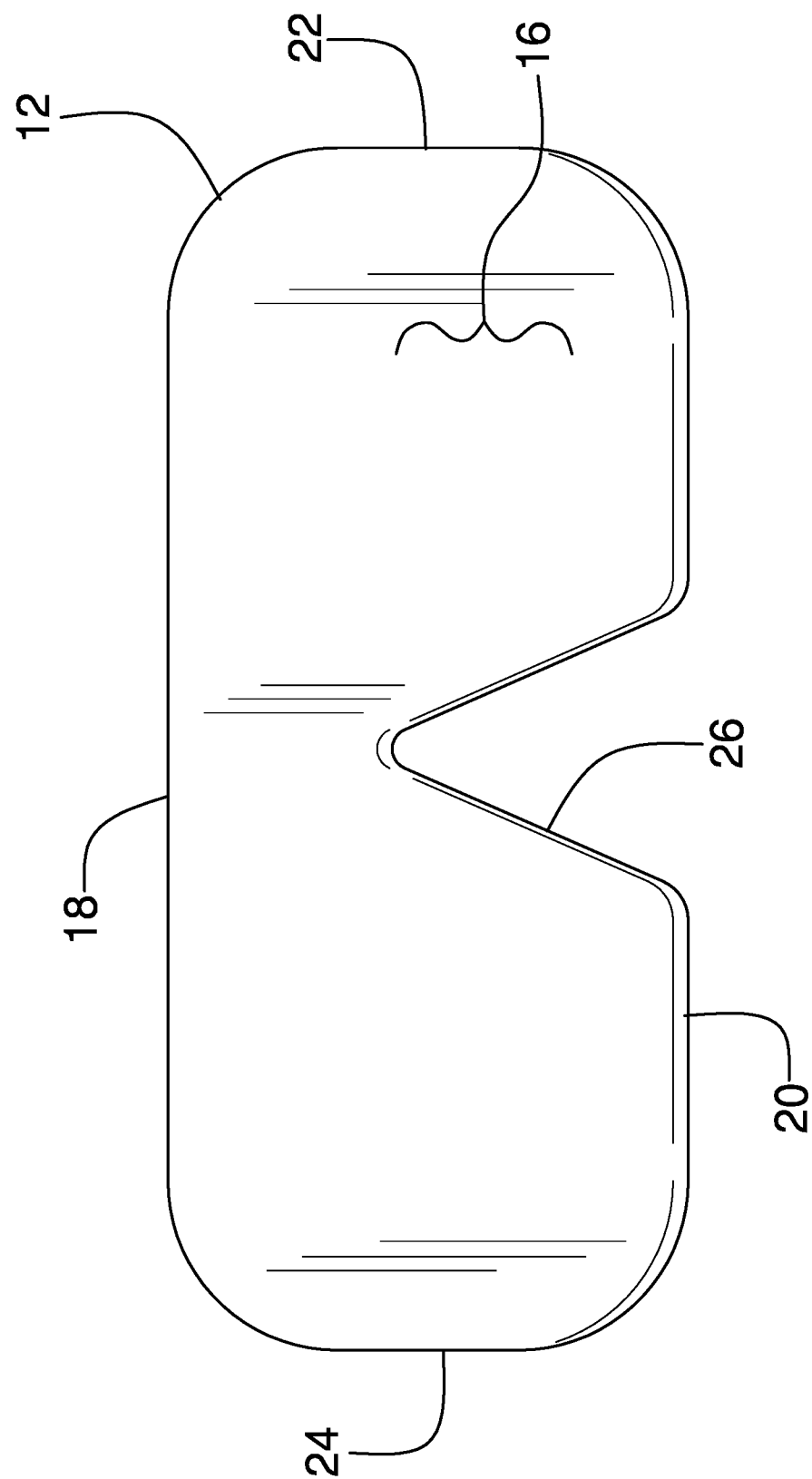
FIG. 3 is a rear elevation view of an embodiment of the disclosure.
Figure 4:
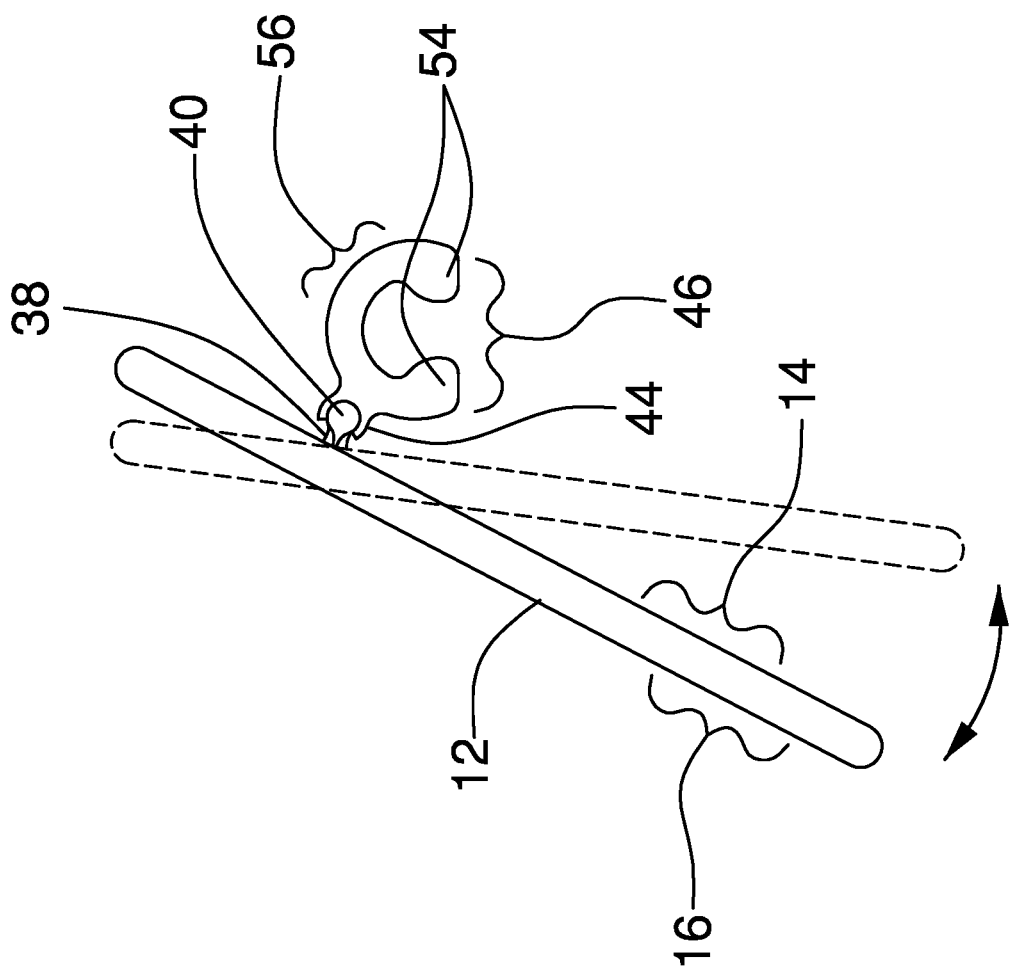
FIG. 4 is a side elevation view of an embodiment of the disclosure.
Figure 5:
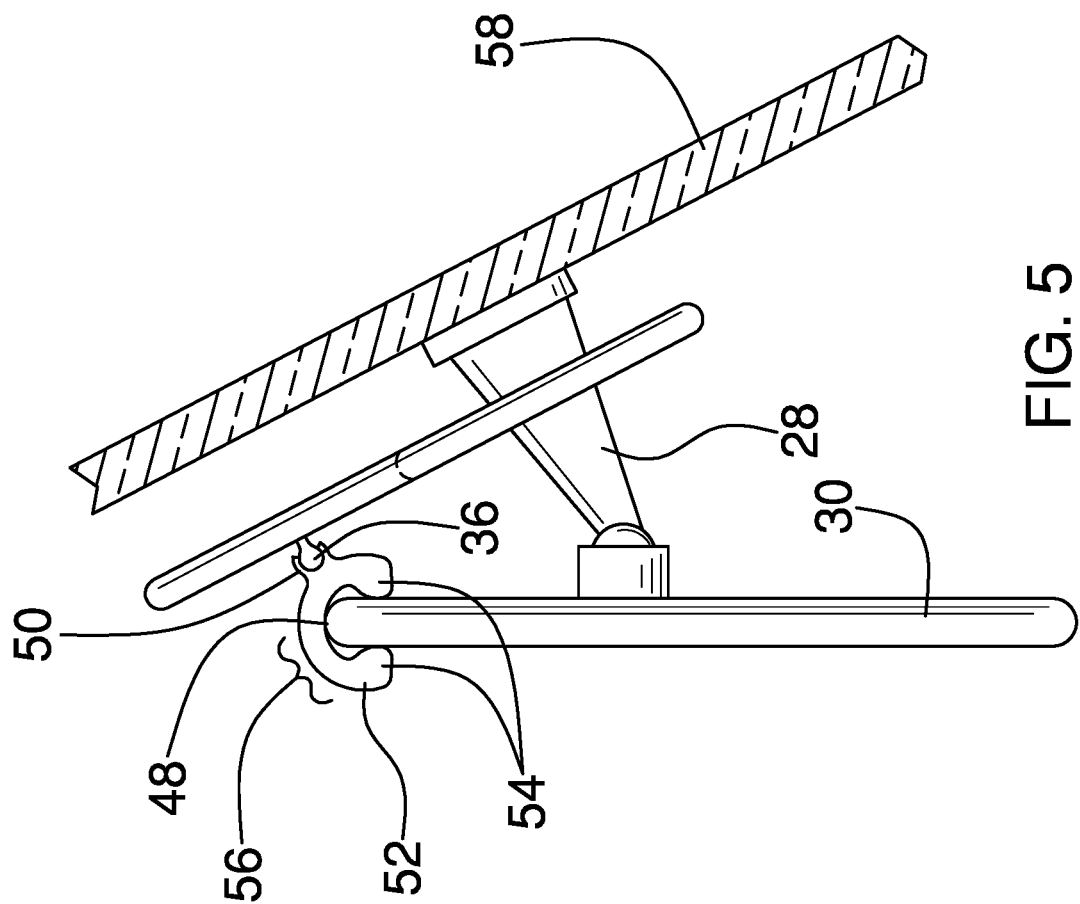
FIG. 5 is an in-use view of an embodiment of the disclosure.
Figure 6:
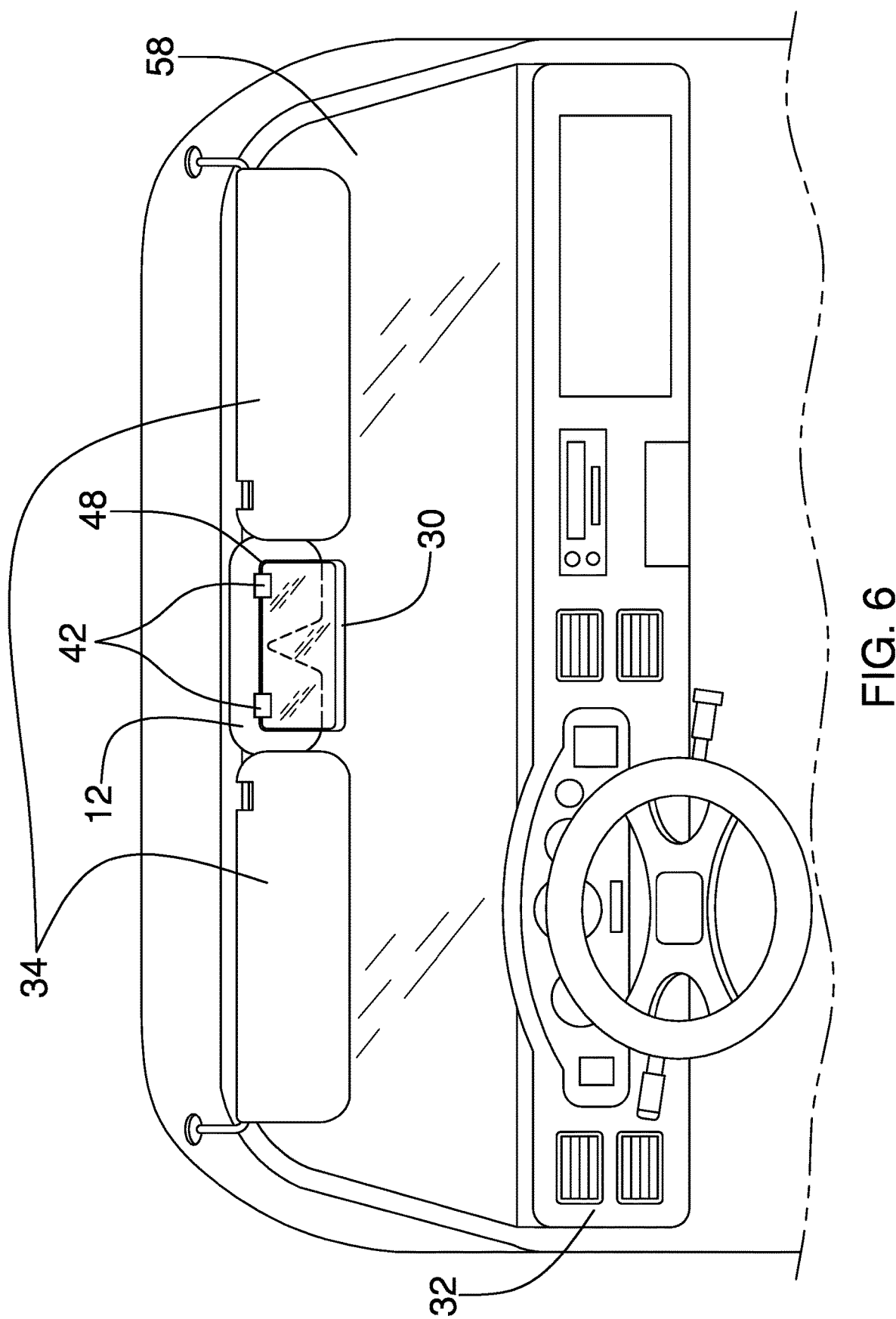
FIG. 6 is an in-use view of an embodiment of the disclosure.
Figure 7:
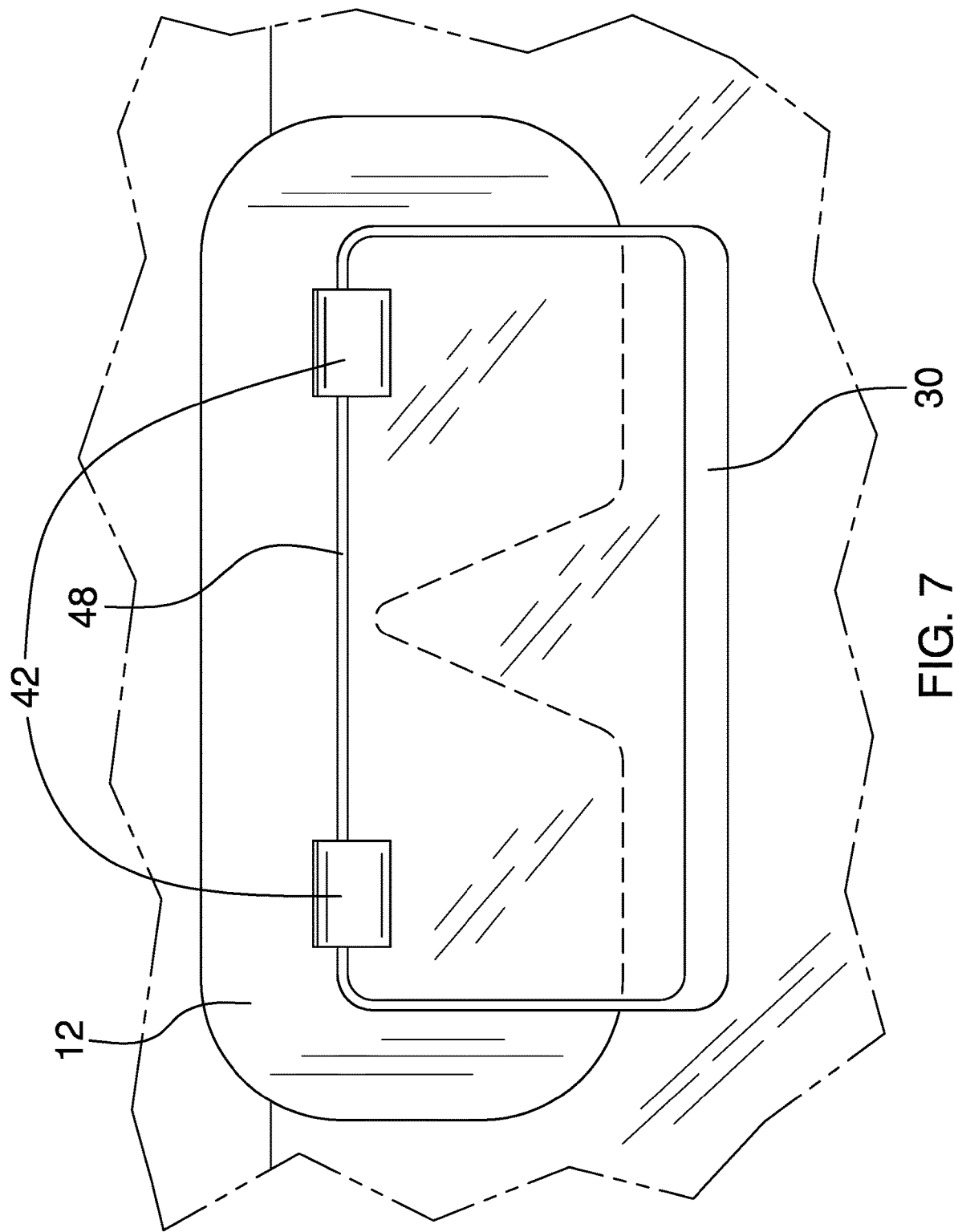
FIG. 7 is an in-use view of an embodiment of the disclosure.

With reference now to the drawings, and in particular to FIGS. 1 through 7 thereof, a new mirror sunshield device embodying the principles and concepts of an embodiment of the disclosure and generally designated by the reference numeral 10 will be described.

As best illustrated in FIGS. 1 through 7, the pivoting mirror sunshield apparatus 10 generally comprises a visor body 12 having a body front side 14, a body back side 16, a body top edge 18, a body bottom edge 20, a body left edge 22, and a body right edge 24. The body bottom edge 20 has a cutout portion 26 extending towards the body top edge 18 and configured to accommodate a mounting arm 28 of a rearview mirror 30 of a vehicle 32. The cutout portion 26 may be an inverted V-shape and may be medially positioned along the body bottom edge 20. The visor body 12 may have rounded corners to prevent snagging on other elements of the vehicle 32. The visor body 12 may be dimensioned to fully extend between a pair of sun visors 34 of the vehicle.

A plurality of clip pivots 36 is coupled to the visor body 12. Each clip pivot 36 has an attachment portion 38 coupled to the body front side 14 and a cylindrical portion 40 extending from the attachment portion 38. The plurality of clip pivots 36 may be a pair of clip pivots 36 each medially positioned between the cutout portion 26 and the body left edge 22 or the body right edge 24, respectively.

A plurality of mirror clips 42 is coupled to the plurality of clip pivots 36. Each mirror clip 42 has a pivot portion 44 pivotably coupled to the respective clip pivot 36 and a clip portion 46 configured to selectively engage a mirror top edge 48 of the rearview mirror 30. The pivot portion 44 of each mirror clip 42 is rotatably engaged with the cylindrical portion 40 of the clip pivot and has a C-shaped profile 50. The clip portion 46 may have a U-shaped profile 52 with a pair of inner flared distal ends 54. The pivot portion 44 extends from an outer face 56 of the U-shaped profile 52 and may be biased towards one of the inner flared distal ends 54 to create a more desirable range of motion for the visor body 12 relative the rearview mirror 30. Each mirror clip 42 is elastically deformable such the clip portion 46 can snap fit on to the rearview mirror 30 and the pair of inner flared distal ends 54 apply sufficient force to the rearview mirror to secure the apparatus 10 even while the visor body 12 is being adjusted.

In use, the plurality of mirror clips 42 are engaged with the rearview mirror 30 such that the visor body 12 sits between the rearview mirror 30 and a windshield 58 of the vehicle with the cutout portion 26 straddling the mounting arm 28 of the rearview mirror. The visor body 12 then blocks sunlight and glare from the user's eyes as he or she looks into the rearview mirror 30.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pivoting mirror sunshield apparatus comprising:
   a visor body having a body front side, a body back side, a body top edge, a body bottom edge, a body left edge, and a body right edge, the body bottom edge having a cutout portion extending towards the body top edge configured to accommodate a mounting arm of a rearview mirror of a vehicle;
   a plurality of clip pivots coupled to the visor body, each clip pivot being coupled to the body front side; and
   a plurality of mirror clips coupled to the plurality of clip pivots, each mirror clip having a pivot portion pivotably coupled to the respective clip pivot and a clip portion configured to selectively engage a mirror top edge of the rearview mirror.

2. The pivoting mirror sunshield apparatus of claim 1 further comprising the visor body having rounded corners.

3. The pivoting mirror sunshield apparatus of claim 1 further comprising the cutout portion being an inverted V-shape.

4. The pivoting mirror sunshield apparatus of claim 1 further comprising the clip pivot having a cylindrical portion, the pivot portion of the mirror clip being rotatably engaged with the cylindrical portion.

5. The pivoting mirror sunshield apparatus of claim 4 further comprising the pivot portion of each mirror clip having a C-shaped profile.

6. The pivoting mirror sunshield apparatus of claim 1 further comprising the clip portion having a U-shaped profile with a pair of inner flared distal ends.

7. The pivoting mirror sunshield apparatus of claim 6 further comprising the pivot portion extending from the U-shaped profile.

8. The pivoting mirror sunshield apparatus of claim 1 further comprising the cutout portion being medially positioned along the body bottom edge; the plurality of clip pivots being a pair of clip pivots each medially positioned between the cutout portion and the body left edge or the body right edge, respectively.

9. A pivoting mirror sunshield apparatus comprising:
   a visor body having a body front side, a body back side, a body top edge, a body bottom edge, a body left edge, and a body right edge, the body bottom edge having a cutout portion extending towards the body top edge configured to accommodate a mounting arm of a rearview mirror of a vehicle, the cutout portion being an inverted V-shape and being medially positioned along the body bottom edge, the visor body having rounded corners;
   a plurality of clip pivots coupled to the visor body, each clip pivot being coupled to the body front side, the clip pivot having a cylindrical portion, the plurality of clip pivots being a pair of clip pivots each medially positioned between the cutout portion and the body left edge or the body right edge, respectively; and
   a plurality of mirror clips coupled to the plurality of clip pivots, each mirror clip having a pivot portion pivotably coupled to the respective clip pivot and a clip portion configured to selectively engage a mirror top edge of the rearview mirror, the pivot portion of each mirror clip being rotatably engaged with the cylindrical portion and having a C-shaped profile, the clip portion having a U-shaped profile with a pair of inner flared distal ends, the pivot portion extending from the U-shaped profile.

* * * * *